US010303500B2

(12) United States Patent
Chen et al.

(10) Patent No.: US 10,303,500 B2
(45) Date of Patent: May 28, 2019

(54) DEPLOYING A VIRTUAL MACHINE IN A COMPUTING ENVIRONMENT

(71) Applicant: International Business Machines Corporation, Armonk, NY (US)

(72) Inventors: Li Long Chen, Beijing (CN); Randy A. Rendahl, Raleigh, NC (US); Xiao Yang Zhu, Beijing (CN); Lin Zhi Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 15/646,415

(22) Filed: Jul. 11, 2017

(65) Prior Publication Data
US 2017/0308393 A1 Oct. 26, 2017

Related U.S. Application Data

(63) Continuation of application No. 14/904,970, filed as application No. PCT/CN2014/085000 on Aug. 22, 2014, now Pat. No. 9,846,590.

(30) Foreign Application Priority Data

Aug. 26, 2013 (CN) .......................... 2013 1 0376402

(51) Int. Cl.
*G06F 9/455* (2018.01)
(52) U.S. Cl.
CPC ...... *G06F 9/45533* (2013.01); *G06F 9/45558* (2013.01); *G06F 2009/4557* (2013.01)
(58) Field of Classification Search
CPC ................................................. G06F 9/45533
(Continued)

(56) References Cited

U.S. PATENT DOCUMENTS 5,835,899 A * 11/1998 Rose .................. G06Q 30/04
  705/34
8,099,487 B1 * 1/2012 Smirnov ............. G06F 11/3495
  709/223
(Continued)

FOREIGN PATENT DOCUMENTS

CN 102446115 5/2012
CN 102646052 8/2012
(Continued)

OTHER PUBLICATIONS

Gong et al., PAC: Pattern-driven Application Consolidation for Efficient Cloud Computing, 2010 18th Annual IEEE/ACM International Symposium on Modeling, Analysis and Simulation of Computer and Telecommunication Systems, 1526-7539/10 copyright 2010 IEEE, DOI 10.1109/MASCOTS.2010.12, pp. 24-33.

(Continued)

*Primary Examiner* — Mehran Kamran
(74) *Attorney, Agent, or Firm* — Schmeiser, Olsen & Watts, LLP; Mark Vallone

(57) ABSTRACT

A method and associated system. In response to a request to deploy a virtual machine in a computing environment, a virtual machine resource usage pattern having attributes matching a subset of attributes in than ordered sequence of attributes is selected from at least one virtual machine resource usage pattern stored in a virtual machine resource usage pattern library, based on an ordering of the attributes in the ordered sequence of attributes, wherein the virtual machine resource usage pattern library stores usage patterns for virtual machines previously deployed. A node on which the virtual machine is to be deployed is selected, based on the selected virtual machine resource usage pattern and predicted runtime resource requirements of the virtual machine to be deployed based on historical running data of virtual machines. The virtual machine is configured for (Continued)

being deployed on the selected node. The virtual machine is deployed on the selected node.

20 Claims, 4 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 8,291,411 | B2* | 10/2012 | Beaty | G06F 9/4856 |
| | | | | 718/1 |
| 9,207,962 | B2* | 12/2015 | Fries | G06F 9/45533 |
| 9,292,350 | B1* | 3/2016 | Pendharkar | G06F 9/5044 |
| 2009/0293045 | A1* | 11/2009 | Cheriton | G06F 8/443 |
| | | | | 717/136 |
| 2010/0250744 | A1* | 9/2010 | Hadad | G06F 9/4856 |
| | | | | 709/226 |
| 2010/0269109 | A1* | 10/2010 | Cartales | G06F 9/5072 |
| | | | | 718/1 |
| 2010/0332658 | A1* | 12/2010 | Elyashev | G06F 9/505 |
| | | | | 709/226 |
| 2011/0214122 | A1* | 9/2011 | Lublin | G06F 9/5033 |
| | | | | 718/1 |
| 2011/0238340 | A1* | 9/2011 | Dasgupta | G06F 17/50 |
| | | | | 702/61 |
| 2011/0283279 | A1* | 11/2011 | Graves | G06F 9/44589 |
| | | | | 718/1 |
| 2012/0030349 | A1* | 2/2012 | Sugai | G06F 9/5077 |
| | | | | 709/224 |
| 2012/0096163 | A1* | 4/2012 | Tai | H04L 41/0856 |
| | | | | 709/226 |
| 2012/0096457 | A1* | 4/2012 | Gupta | G06F 9/45558 |
| | | | | 718/1 |
| 2012/0151480 | A1* | 6/2012 | Diehl | G06F 9/461 |
| | | | | 718/1 |
| 2012/0198073 | A1* | 8/2012 | Srikanth | G06F 9/5027 |
| | | | | 709/226 |
| 2012/0266164 | A1* | 10/2012 | Anderson, III | G06F 9/5077 |
| | | | | 718/1 |
| 2012/0324114 | A1* | 12/2012 | Dutta | G06F 9/5066 |
| | | | | 709/226 |
| 2012/0324445 | A1* | 12/2012 | Dow | G06F 9/45504 |
| | | | | 718/1 |
| 2013/0007732 | A1* | 1/2013 | Fries | G06F 9/45533 |
| | | | | 718/1 |
| 2013/0024859 | A1* | 1/2013 | Lee | G06F 9/5011 |
| | | | | 718/1 |
| 2013/0042123 | A1* | 2/2013 | Smith | G06F 9/5077 |
| | | | | 713/300 |
| 2013/0080619 | A1* | 3/2013 | Assuncao | G06F 9/45558 |
| | | | | 709/224 |
| 2013/0097601 | A1* | 4/2013 | Podvratnik | G06F 9/5027 |
| | | | | 718/1 |
| 2014/0119213 | A1* | 5/2014 | Devarasetty | H04L 5/0091 |
| | | | | 370/252 |
| 2014/0189684 | A1* | 7/2014 | Zaslavsky | G06F 9/45533 |
| | | | | 718/1 |
| 2014/0229933 | A1* | 8/2014 | Kanungo | G06F 9/45558 |
| | | | | 718/1 |
| 2014/0258446 | A1* | 9/2014 | Bursell | G06F 15/177 |
| | | | | 709/217 |
| 2014/0282520 | A1* | 9/2014 | Sabharwal | G06F 9/455 |
| | | | | 718/1 |
| 2015/0058148 | A1* | 2/2015 | Grosz | G06Q 30/0269 |
| | | | | 705/26.2 |
| 2015/0128131 | A1* | 5/2015 | Cao | G06F 9/4856 |
| | | | | 718/1 |
| 2015/0242234 | A1* | 8/2015 | Harris | G06F 9/4856 |
| | | | | 718/1 |
| 2016/0162308 | A1 | 6/2016 | Chen et al. | |

FOREIGN PATENT DOCUMENTS

| | | |
|---|---|---|
| CN | 103067425 | 4/2013 |
| WO | WO 2015027865 | 3/2015 |

OTHER PUBLICATIONS

Anh Vu Do et al., Profiling Applications for Virtual Machine Placement in Clouds, 2011 IEEE 4th International Conference on Cloud Computing, 978-0-7695-4460-1/11 copyright 2011 IEEE, DOI 10.1109/CLOUD.2011.75, pp. 660-667.

Iqbal et al., SLA-Driven Dynamic Resource Management for Multi-tier Web Applications in a Cloud, 2010 10th IEEE/ACM International Conference on Cluster, Cloud and Grid Computing, 978-0-7695-4039-9/10 copyright 2010 IEEE, DOI 10.1109/CCGRID.2010.59, pp. 832-837.

Cao Le Thanh Man et al., Virtual Machine Placement Algorithm for Virtualized Desktop Infrastructure, PRoceedings of IEEE CCIS2011, 978-1-61284-204-2/11 copyright 2011 IEEE, pp. 333-337.

Office Action (dated Dec. 16, 2016) for U.S. Appl. No. 14/904,970, filed Jan. 15, 2016.

Amendment (dated Mar. 16, 2017) for U.S. Appl. No. 14/904,970, filed Jan. 15, 2016.

Notice of Allowance (dated May 25, 2017) for U.S. Appl. No. 14/904,970, filed Jan. 15, 2016.

* cited by examiner

DEPLOYING A VIRTUAL MACHINE IN A COMPUTING ENVIRONMENT

This application is a continuation application claiming priority to Ser. No. 14/904,970, filed Jan. 15, 2016.

BACKGROUND

The present invention relates to cloud computing, and more specifically, to a method and apparatus for deploying a virtual machine in a computing environment including a plurality of nodes.

At present, a cloud service can be provided for a customer through a cloud computing environment (also known as a cloud computing platform or a cloud service platform). The cloud computing environment includes a plurality of nodes (or referred to as cloud computing nodes or cloud service nodes), each of which has physical resources, such as a central processing unit (CPU), a memory, a disk and so on. When the customer needs the cloud service; i.e., when the customer needs to use computing resources of the cloud computing environment, the customer sends a request to deploy a virtual machine which will be configured with the computing resources. In response to the request, physical resources on a certain node in the cloud computing environment are configured in order to deploy the virtual machine on the node, and then the virtual machine is provided for the customer. Since the cloud computing environment includes the plurality of nodes, and each of the nodes has a different resource usage status, a problem to be solved in the above virtual machine deployment process is how to know resource requirement features of the virtual machine to be deployed at runtime in a predictable manner so as to reasonably select the node on which the virtual machine is deployed, so that a throughput of the cloud computing environment is optimized while providing a good service experience for the customer.

A variety of approaches for selecting a node on which a virtual machine is to be deployed have been proposed. For example, one of the approaches is a Round Robin method, in which virtual machines for customers are deployed in turn on all available nodes in the cloud computing environment in a round robin fashion. Another approach is a Simple Greedy method, in which the virtual machines for customers are always deployed on a same one node until available resources on the node are exhausted. However, all these approaches select the node based on static configuration information at the time of deployment of the virtual machine, rather than based on resource requirement features of the virtual machine at runtime. Specifically, the amounts of resources consumed at runtime (namely, runtime resource requirements) of virtual machines for different customers and different application scenarios vary with specific usage scenarios of the customers dynamically, thus the virtual machines have different resource requirement features. However, when selecting the node on which the virtual machine is deployed, the above two approaches merely take into account the initial static resource requirements of the virtual machine, i.e., the resource requirements determined when the request is sent, but fail to take into account the dynamic runtime resource requirements of the virtual machine. Since the initial static resource requirements of the virtual machine is often different from the runtime resource requirement thereof, in some cases the node selected by the two approaches can not meet the runtime resource requirements of the virtual machine, which renders that the throughput of the cloud service system decreases and the user experience is deteriorated.

SUMMARY

In view of the above problem, the present invention is proposed. An object of the present invention is to provide a method and apparatus for deploying a virtual machine in a computing environment (e.g., a cloud computing environment), which can predict dynamic runtime resource requirements of the virtual machine for a customer, so as to reasonably select a node in the computing environment and deploy the virtual machine, thereby optimizing a throughput of the cloud computing environment while providing a good experience for the customer.

According to an aspect of the present invention, there is provided a method for deploying a virtual machine in a computing environment including a plurality of nodes, comprising: selecting a virtual machine resource usage pattern matching the virtual machine to be deployed from at least one virtual machine resource usage pattern, in response to a request to deploy the virtual machine; selecting a node on which the virtual machine is to be deployed from the plurality of nodes based on the selected virtual machine resource usage pattern and available resources of the plurality of nodes; and deploying the virtual machine on the selected node.

According to another aspect of the present invention, there is provided an apparatus for deploying a virtual machine in a computing environment including a plurality of nodes, comprising: a pattern selecting device configured to select a virtual machine resource usage pattern matching the virtual machine to be deployed from at least one virtual machine resource usage pattern, in response to a request to deploy the virtual machine; a node selecting device configured to select a node on which the virtual machine is to be deployed from the plurality of nodes based on the selected virtual machine resource usage pattern and available resources of the plurality of nodes; and a deploying device configured to deploy the virtual machine on the selected node.

With the method and apparatus according to the above aspects of the present invention, the resource requirements of the virtual machine to be deployed at runtime, i.e., resource requirements at the time when the virtual machine actually runs in future, can be "predicted" based on a pre-created virtual machine resource usage pattern; then the node on which the virtual machine is to be deployed may be selected based on the predicted runtime resource requirements. In this way, it may be ensured that the selected node can meet the dynamic resource requirements of the virtual machine to be deployed at actual runtime, thereby optimizing the throughput of the computing environment while providing a good customer experience.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
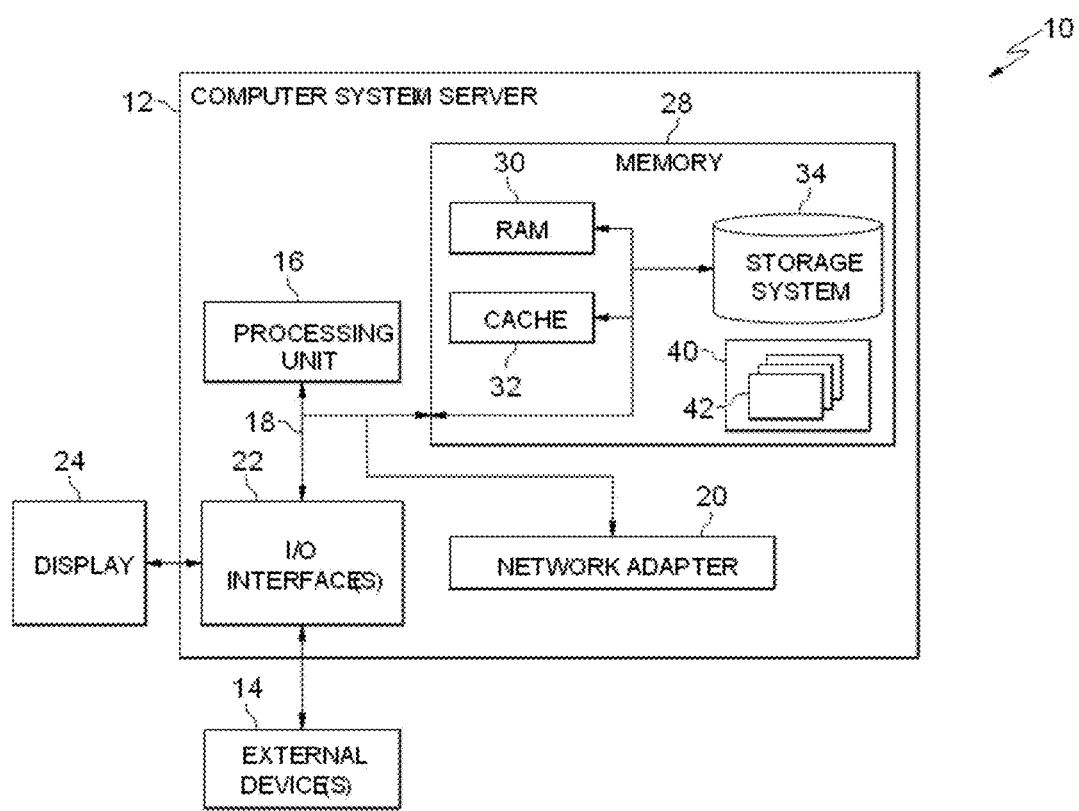
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. The cloud infrastructure may be managed by the organization or a third party and may exist on-premises or off-premises.

Community cloud: the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
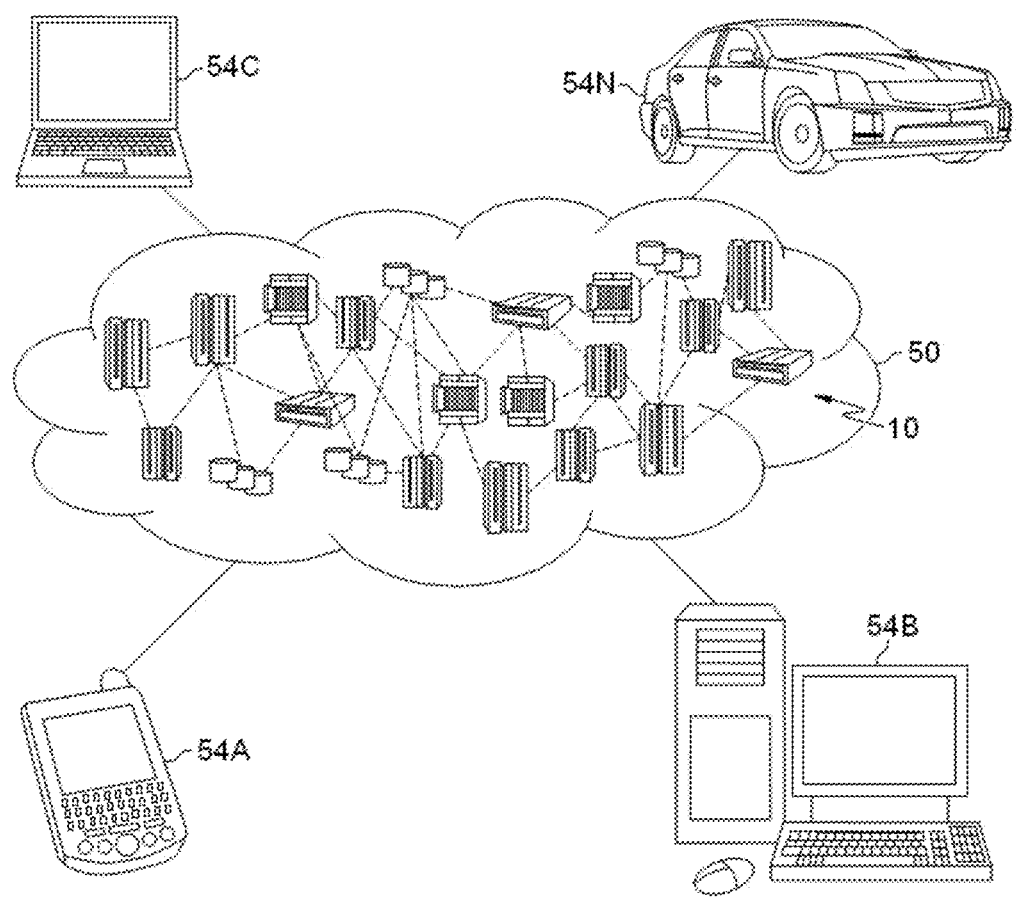
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
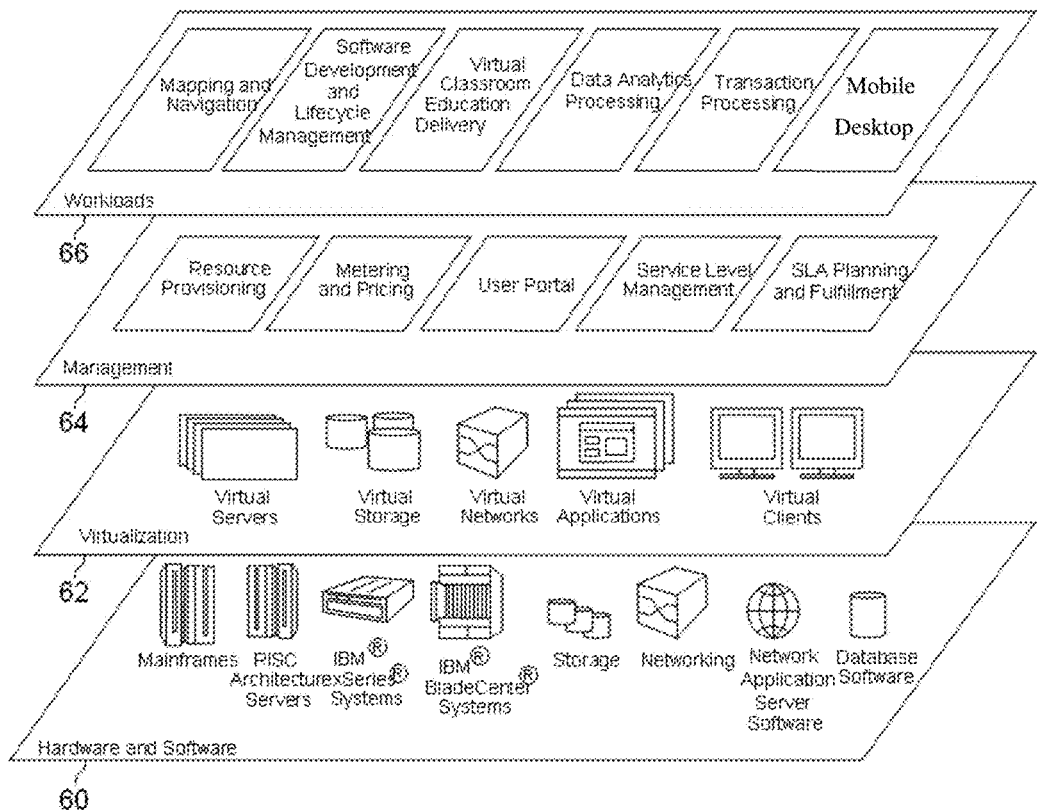
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktops.

Hereinafter, a method for deploying a virtual machine in a computing environment according to an embodiment of the present invention is described with reference to FIG. 4. The method can be executed, for example, in the management layer 64. Hereinafter, the embodiment of the present invention is described by taking the cloud computing environment as an example, but it is to be recognized that the embodiment is also applicable to other types of computing environments.

As described above, the cloud computing environment includes a plurality of nodes, each of which has a variety of physical resources, such as a CPU, a memory, a hard disk, etc. When a customer needs to use resources in the cloud computing environment, the customer sends a request to deploy a virtual machine for the customer (hereinafter referred to as a new virtual machine for convenience of description), and the new virtual machine will be configured with the resources needed by the customer. In response to the request, a proper node is selected from the plurality of nodes in the cloud computing environment, then the new virtual machine is deployed on the selected node, and the customer is provided with services by running the virtual machine.

In the embodiment of the present invention, when the customer requests to deploy the new virtual machine, runtime resource requirements of the new virtual machine (i.e., resource requirements of the virtual machine at the time when it actually runs in the future) can be predicted based on historical running data of virtual machines which have been deployed in the cloud computing environment and have attribute information which is the same as at least a part of attribute information of the new virtual machine, then the node on which the new virtual machine is to be deployed is selected based on the predicted runtime resource requirements.

Specifically, multiple virtual machines for different customers and/or one or more virtual machines for a single customer may have been deployed and run in the cloud computing environment. The virtual machines for different customers may have different attribute information, the virtual machine(s) for the single customer may have the same or different attribute information, and their resource requirements (or called resource requirement features) at runtime may be the same or different. As described below, the attribute information may be static information associated with the virtual machines, such as customer information of the customers associated with the virtual machines and their business-related information, usage patterns of the virtual machines, and so on. In the embodiment of the present invention, the virtual machines are categorized into different types based on their attribute information, where the virtual machines having the same attribute information are virtual machines of the same type, and the virtual machines having different attribute information are virtual machines of different types. Based on historical running data of at least one virtual machine of each type that has been deployed, a virtual machine resource usage pattern corresponding to the virtual machine of such type can be created, the created virtual machine usage pattern may at least include the attribute information of the virtual machine of such type, and resource usage information of the virtual machine of such type at runtime (which includes amounts of various resources consumed at runtime), and the resource usage information indicates the resource requirement features of the virtual machine of such type at runtime. Thus, when the new virtual machine is to be deployed, a virtual machine resource usage pattern matching the new virtual machine can be found in the created virtual machine resource usage patterns, then the runtime resource requirements of the new virtual machine are predicted by using the runtime resource usage information in the virtual machine resource usage pattern, so as to select the node based on the predicted runtime resource requirements which are closer to real runtime resource requirements as compared with the static configuration information used in conventional approaches. Proxies installed in the virtual machines which have been deployed can be used to obtain the historical running data of the virtual machines.

The virtual machine resource usage pattern according to the embodiment of the present invention will be described in detail below. As described above, the virtual machine resource usage pattern created based on the historical running data of the virtual machine of each type which has been deployed may at least include the attribute information of the virtual machine of such type, and the resource usage information of the virtual machine of such type at runtime (hereinafter referred to as runtime resource usage information).

The attribute information of the virtual machine contained in the virtual machine resource usage pattern may include at least one attribute of the virtual machine. In one example, the at least one attribute may include one or more of a virtual machine image type, a virtual machine master application, a virtual machine usage pattern, a customer ID of a customer served by the virtual machine, a customer industry of the customer, and a business unit of the customer. The virtual machine image type indicates a type of an operating system installed in the virtual machine of such type, such as Linux, Windows, etc. The virtual machine master application indicates a type of an application mainly executed by the virtual machine of such type, such as a database, etc. The virtual machine usage pattern indicates a type of a service provided by the application executed by the virtual machine of such type; for example, in the case where the application is a database, if the database merely provide a query service, the virtual machine usage pattern may be "report", whereas if the database can provide an information accessing service, the virtual machine usage pattern may be "transaction". The customer ID refers to identity information of the customer served by the virtual machine of such type, such as the customer's name (e.g., Citibank) or identity information in other forms. The customer industry refers to an industry to which the customer belongs, such as a banking industry, a manufacturing industry, etc. The business unit of the customer refers to a specific business unit to which the customer belongs; in the example where the customer is a multinational bank, the business unit of the customer may be, for example, "Credit Card→Country A1→Province B1→City C1→Branch D1". With the above attributes, different customers can be distinguished from one another. It is to be noted that the respective attributes listed above are exemplary only, rather than limitative. The attributes contained in the attribute information can be flexibly selected according to actual needs. For example, the attribute information may not include one or both of the virtual machine master application and the virtual machine usage pattern. In addition, the attribute information of the virtual machine can be divided into a plurality of levels, so that a matching operation is performed level by level in the subsequent matching process. For example, the virtual machine image type, the virtual machine master application, the virtual machine usage pattern, the customer ID of the customer served by the virtual machine, the customer industry of the customer, and the business unit of the customer can be located on the plurality of levels from high level to low level in the order in which they are mentioned. Moreover, each attribute can be further divided into one or more levels.

The runtime resource usage information of the virtual machine contained in the virtual machine resource usage pattern may include resource consumption amount information indicating amounts of various resources consumed by the virtual machine of such type at runtime, and may also optionally include running feature information related to running of the virtual machine of such type, such as peak time (time at which a load is maximum) or throughput of the virtual machine of such type. In one example, the runtime resource usage information contained in the virtual machine resource usage pattern can be "CPU Usage=2VCPU, Memory Usage=200 MB, Disk IO=100IOPS, Network IO=100 Mbps, Disk Usage=1.5G, Peak Time=20:00→3:30, Throughput=3960000], which indicates that the virtual machine of such type requires at runtime 2 virtual CPUs, 1024 MB virtual machine memory space, 100 disk I/O operations per second, 100 Mbps network I/O rate, and 1.5G hard disk space, the peak time of the virtual machine is 20:00 to 23:30, and the throughput is 3,960,000 bytes. In the case where only one virtual machine of such type is deployed in the cloud computing environment, the amounts of various resources consumed by the virtual machine at runtime and the running feature information thereof can be used as the runtime resource usage information of the virtual machine. In the case where multiple virtual machines of such type are deployed in the cloud computing environment, resource usage information obtained based on various system resources actually consumed by the respective virtual machines at runtime and the running feature information thereof can be used as the runtime resource usage information of the virtual machines; for example, averages of amounts of various resources consumed by the respective virtual machines at runtime can be used as the resource consumption information in the runtime resource usage information, and the running feature information determined from the running feature information of the respective virtual machines in any proper manner can be used as the running feature information in the runtime resource usage information.

In addition to the above attribute information and runtime resource usage information, the virtual machine resource usage pattern may further include source information which represents relevant information of one or more virtual machines which are data sources of the runtime resource usage information. For example, the source information may include: information related to a node (i.e., hosting node) where each virtual machine which is the data source resides in the cloud computing environment, such as ID and IP address of the node, running time of the node, and so on; information related to the virtual machine per se, such as ID and IP address of the virtual machine, running time of the virtual machine, and so on; and other information selected as needed. In one example; assuming that the runtime resource usage information of a certain virtual machine resource usage pattern is determined based on historical running data of three virtual machines of the same type, VM1, VM2 and VM3, and the three virtual machines are located on node (i.e., host) A, node A and node B, respectively, the source information can be expressed as: [Hypervisor ID: Host A, Hypervisor IP: 9.186.115.73, Hypervisor Running Hours: 3000 h, {VM ID: VM1, VM IP: 192.168.100.23, VM Running Hours: 89 h; VM ID: VM2, VM IP: 192.168.100.11, VM Running Hours: 29 h}; Hypervisor ID: Host B, Hypervisor 9.186.115.74, Hypervisor Running Hours: 3200 h, {VM ID: VM3, VM IP: 192.168.101.10, VM Running Hours: 26 h}]. It is to be appreciated that the formats of the information given above are exemplary only, and any other proper formats may be adopted as needed.

When the cloud computing environment is built initially, each node in the cloud computing environment is idle, therefore when a first request to deploy a virtual machine (referred to as a first virtual machine for convenience of description) is received from a customer, a node in the cloud computing environment can be randomly selected to deploy and run the first virtual machine. Subsequently, a corresponding virtual machine resource usage pattern can be created based on attribute information and running data of the first virtual machine. After that, when a second request to deploy a virtual machine (referred to as a second virtual machine for convenience of description) is received from a customer, if the second virtual machine has attribute information which is the same as that of the first virtual machine, i.e., the second virtual machine and the first virtual machine are virtual machines of the same type, then after the second virtual machine is deployed in accordance with the method described below and runs, the virtual machine resource usage pattern can be updated by using the running data of the second virtual machine. Specifically, the virtual machine resource usage pattern can be updated by updating the runtime resource usage information and the source information (if any) in the virtual machine resource usage pattern. For example, the resource consumption amount information in the runtime resource usage information contained in the virtual machine resource usage pattern can be updated into averages of amounts of various resources consumed by the second virtual machine at runtime and various resource consumption amounts originally recorded in the runtime resource consumption amount information, and correspondingly, information related to a node where the second virtual machine resides, information related to the second virtual machine per se, and other relevant information are added into the source information to update the source information. On the other hand, when the second virtual machine does not have attribute information which is the same as that of the first virtual machine, the second virtual machine and the first virtual machine are virtual machines of different types, and at this time, after the second virtual machine is deployed in accordance with the method described below and runs, a corresponding virtual machine resource usage pattern can be created based on the running data of the second virtual machine. For a subsequent request to deploy a virtual machine from a customer, the above process is repeated, so as to create or update at least one virtual machine resource usage pattern created for virtual machines of different types. The at least one resource usage pattern may be stored in, for example, a virtual machine resource usage pattern library, and can be queried and extracted when necessary.

Hereinafter, the method for deploying the virtual machine in the computing environment (e.g., the cloud computing environment according to the embodiment of the present invention is described with reference to FIG. 4.

Figure 4:
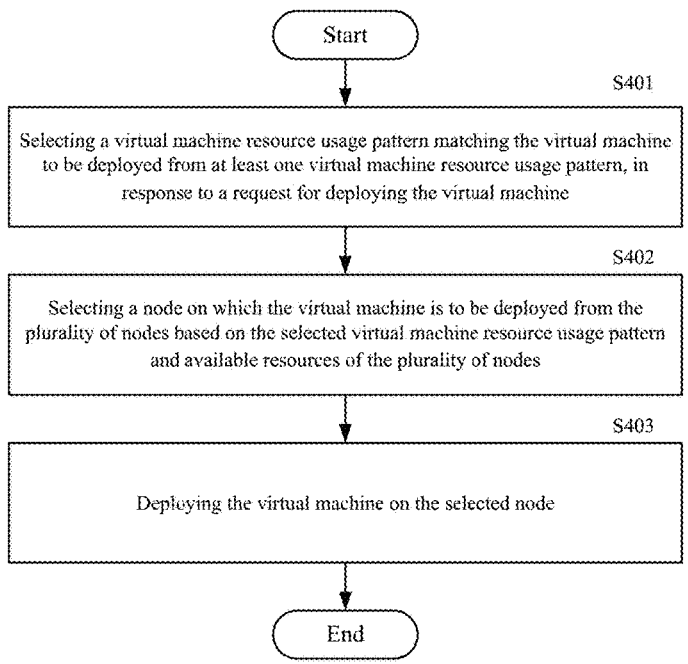
FIG. 4 shows a flow chart of a method for deploying a virtual machine in a cloud computing environment according to an embodiment of the present invention.

As shown in FIG. 4, in step S401, in response to a request to deploy a virtual machine in a computing environment (e.g., the cloud computing environment 50), a virtual machine resource usage pattern matching the virtual machine to be deployed is selected from at least one virtual machine resource usage pattern. In one embodiment, the request identies an ordered sequence of attributes that the virtual machine to be deployed comprises. In one embodiment, the virtual machine resource usage pattern has attributes matching a subset of attributes in the ordered sequence of attributes. In one embodiment, the virtual machine resource usage pattern is based on an ordering of the attributes in the ordered sequence of attributes.

As described above, when a customer needs to use resources of the cloud computing environment, the customer will send the request to deploy the virtual machine. The request contains attribute information of the virtual machine. The attribute information contained in the request may be all or a part of attribute information contained in the virtual machine resource usage pattern, and can be specified by the customer, for subsequent use to select the virtual machine resource usage pattern. In the following description, as an example, it is assumed that the attribute information of the virtual machine contained in the request is the same as that contained in the virtual machine resource usage pattern, and both of them include a virtual machine image type, a virtual machine master application, a virtual machine resource usage pattern, a customer ID, a customer industry and a customer business unit.

A virtual machine resource usage pattern having attribute information which is the same as at least a part of the attribute information contained in the request can be selected from at least one virtual machine resource usage pattern, as the virtual machine resource usage pattern matching the virtual machine to be deployed. Specifically, the attribute information contained in the request can be divided into a plurality of levels, and attribute information which the virtual machine resource usage pattern matching the virtual machine to be deployed should have is determined from the attribute information contained in the request in an order of the levels (e.g., in an order from a low level to a high level). Herein, it is assumed that the attribute information contained in the request is sequentially the virtual machine image type (=Linux), the virtual machine master application (=database), the virtual machine usage pattern (=transaction), the customer industry (=banking industry), the customer ID (=Citibank), and the customer business unit in the order from the high level to the low level, and the customer business unit can be further divided into five levels, which are sequentially Credit Card→Country A1→Province B1→City C1→Branch D1 in the order from the high level to the low level.

Firstly, a selection operation at the first level is performed. Specifically, it is determined whether, in the at least one resource usage pattern, there is a virtual machine resource usage pattern having attribute information completely the same as the attribute information contained in the request, and if there is such virtual machine resource usage pattern, this virtual machine resource usage pattern is selected as the virtual machine resource usage pattern matching the virtual machine requested to be deployed, in this example, it is determined whether, in the at least one resource usage pattern, there is a virtual machine resource usage pattern having attribute information "the virtual machine image type (=Linux), the virtual machine master application (=database), the virtual machine usage pattern (=transaction), the customer industry (=banking industry), the customer ID (=Citibank), and the customer business unit (Credit Card-→Country A1→Province B1→City, C1→Branch D1)". This determination can be carried out by comparing the attribute information in the virtual machine resource usage pattern with the attribute information contained in the request. Preferably, an additional criterion can be set for the selection operation at the first level, such that in the selection operation at the first level, it is determined whether, in the at least one resource usage pattern, there is a virtual machine resource usage pattern having attribute information completely the same as the attribute information contained in the request and meeting the additional criterion, and if there is such virtual machine resource usage pattern, this virtual machine resource usage pattern is selected as the virtual machine resource usage pattern matching the virtual machine requested to be deployed. The additional criterion can be set flexibly according to actual needs.

If the matching virtual machine resource usage pattern is not found in the selection operation at the first level, a selection operation at the second level can be performed. Specifically, the attribute information at the lowest level contained in the request is discarded, and it is determined whether, in the at least one virtual machine resource usage pattern, there is a virtual machine resource usage pattern having attribute information the same as remaining attribute information contained in the request, and if there is such virtual machine resource usage pattern, this virtual machine resource usage pattern is selected as the virtual machine resource usage pattern matching the virtual machine requested to be deployed. In this example, the attribute information at the lowest level contained in the request, "Branch D1", is discarded, and it is determined whether there is a virtual machine resource usage pattern having attribute information "the virtual machine image type (=Linux), the virtual machine master application (=database), the virtual machine usage pattern (=transaction), the customer industry (=banking industry), the customer ID (=Citibank), and the customer business unit (Credit Card-→Country A1→Province B1→City C1)". If there is such virtual machine resource usage pattern, this virtual machine resource usage pattern is selected as the virtual machine resource usage pattern matching the virtual machine requested to be deployed. An additional criterion may also be set for the selection operation at the second level, such that it is determined whether, in the at least one resource usage pattern, there is a virtual machine resource usage pattern having attribute information the same as the remaining attribute information contained in the request and meeting the additional criterion, and if there is such virtual machine resource usage pattern, this virtual machine resource usage pattern is selected as the virtual machine resource usage pattern matching the virtual machine requested to be deployed. The additional criterion can be set flexibly according to actual needs. For example, the predetermined criterion may be set as a total number of virtual machines recorded in the source information of the virtual machine resource usage pattern being greater than 70, so as to select a virtual machine resource usage pattern created based on the historical running data of more than 70 virtual machines.

If the matching virtual machine resource usage pattern is not found in the selection operation at the second level, a selection operation at the third level can be performed. Specifically, the attribute information at the second lowest level contained in the request is further discarded, and it is determined whether, in the at least one virtual machine resource usage pattern, there is a virtual machine resource usage pattern having attribute information the same as remaining attribute information contained in the request, and if there is such virtual machine resource usage pattern, this virtual machine resource usage pattern is selected as the virtual machine resource usage pattern matching the virtual machine requested to be deployed. In this example, the attribute information at the second lowest level contained in the request, "City C1", is further discarded, and it is determined whether there is a virtual machine resource usage pattern having attribute information "the virtual machine image type (=Linux), the virtual machine master application (=database), the virtual machine usage pattern (=transaction), the customer industry (=banking industry), the customer ID (=Citibank), and the customer business unit (Credit Card→Country A1→Province B1)". If there is such virtual machine resource usage pattern, this virtual machine resource usage pattern is selected as the virtual machine resource usage pattern matching the virtual machine requested to be deployed. An additional criterion may also be set for the selection operation at the third level, such that it is determined whether, in the at least one resource usage pattern, there is a virtual machine resource usage pattern having attribute information the same as the remaining attribute information contained in the request and meeting the additional criterion, and if there is such virtual machine resource usage pattern, this virtual machine resource usage pattern is selected as the virtual machine resource usage pattern matching the virtual machine requested to be deployed. The additional criterion can be set flexibly according to actual needs. For example, the predetermined criteria can be set as total running time of the virtual machines recorded in the source information of the virtual machine resource usage pattern is greater than 1000 days.

In the above manner, selection operations of the virtual machine resource usage pattern can be performed level by level, that is, the attribute information which the virtual machine resource usage pattern matching the virtual machine to be deployed should have is determined from the attribute information contained in the request in the order from the low level to the high level, then it is checked whether there is the matching virtual machine resource usage pattern in the at least one virtual machine resource usage pattern, until the matching virtual machine resource usage pattern is found, or until a selection operation at the highest level has been performed but the matching virtual machine resource usage pattern is still not found. Alternatively, a terminating condition may be set for the above level-by-level selection operations, so that when the terminating condition is met, the level-by-level selection operations are terminated. For example, the terminating condition may be that if the matching virtual machine resource usage pattern is still not found after a selection operation at a certain level is performed, the level-by-level selection operations are terminated. In one embodiment, the at least one virtual machine resource usage pattern is a plurality of virtual machine resource usage patterns, wherein the attributes in the ordered sequence of attributes are denoted and sequenced as $A_1, A_2, \ldots, A_N$, wherein N is at least 2, and wherein said the virtual machine resource usage pattern comprises: determining a maximum value of M in a range of 1 to N for which a condition is satisfied, wherein the condition is that one or more virtual machine resource usage patterns of the plurality of virtual machine resource usage patterns match $A_1, A_2, \ldots, A_M$. In one embodiment, determining the maximum value of M comprises initially setting M=N and subsequently iteratively looping through the ordered sequence of attributes from $A_M$ to $A_1$ to determine for each iteration of the looping whether the condition is satisfied, and if so then terminating the looping with a final value of M having been determined, and if not then decrementing M by 1 and performing a next iteration of the looping.

Returning to FIG. 4, in the case where the virtual machine resource usage pattern matching the virtual machine to be deployed is found and selected, at step S402, a node on which the virtual machine is to be deployed is selected from the plurality of nodes, based on the selected virtual machine resource usage pattern and available resources of the plurality of nodes. In one embodiment, selection of the node on which the virtual machine is to be deployed is based on the selected virtual machine resource usage pattern and predicted runtime resource requirements of the virtual machine to be deployed. In one embodiment, the runtime resource requirements of the virtual machine to be deployed is predicted based on historical running data of a plurality of virtual machines at the plurality of nodes in the computing environment, wherein the plurality of virtual machines have been previously deployed in the computing environment and comprise the selected virtual machine resource usage pattern. In one embodiment, the historical running data of the plurality of virtual machines comprise amounts of specified resources previously consumed at runtime by each virtual machine of the plurality of virtual machines.

As described above, the runtime resource usage information in the selected virtual machine resource usage pattern includes the resource consumption amount information indicating the resource consumption amounts of the virtual machine at runtime, and the node on which the virtual machine to be deployed is deployed can be determined by comparing the resource consumption amount recorded in the resource consumption amount information with the available resources of the respective nodes. For example, a node which have more available resources than the resource consumption amounts recorded in the selected virtual machine resource usage pattern can be selected as the node on which the virtual machine to be deployed is deployed, and in the case where there are a plurality of such nodes, any one of the nodes or a node determined according to a predetermined criterion (e.g., a node having the most available resources) can selected as the node for deploying the virtual machine. The available resources of the nodes can be known through hypervisors installed on the respective nodes.

Next, at step S403, the virtual machine to be deployed is deployed on the selected node. By deploying and running the virtual machine, services can be provided for the customer. The deployed virtual machine can be configured with resources no less than the resource consumption amounts recorded in the selected virtual machine resource usage pattern. The virtual machine can be deployed on the selected node by using a method commonly known in the art. For example, the virtual machine can be deployed by selecting an appropriate virtual machine image from a preset virtual machine image library and deploying it on the selected node. Moreover, the selected resource usage pattern can be updated in the above-described manner based on the resource usage information of the deployed virtual machine at runtime.

On the other hand, as mentioned above, there may be a case where the virtual machine resource usage pattern matching the virtual machine to be deployed still can not be found through the level-by-level selection operations. In such case, it may be checked whether there are empirical data corresponding to the virtual machine to be deployed. The empirical data indicate amounts of various resources consumed at runtime by a virtual machine of the same type as the virtual machine to be deployed, which are obtained by experience. The empirical data can be obtained in a variety of ways. For example, the empirical data can be obtained based on attribute information and running data of a virtual machine having best performance, or can be obtained by analyzing running data of virtual machines collected from a data center of the cloud computing environment. If there are such empirical data, the empirical data can be used as the predicted resource consumption amounts of the virtual machine to be deployed at runtime, so that the node for deploying the virtual machine is selected based on the empirical data and the available resources of the respective nodes, and then the virtual machine is deployed on the selected node. On the other hand, if there are no such empirical data, a node in the cloud computing environment may be selected randomly, and then the virtual machine is deployed on the selected node. In both cases, a corresponding virtual machine resource usage pattern can be created based on the running data of the deployed virtual machine in the manner described above and can be stored in the virtual machine resource usage pattern library for use when a subsequent request for deploying a virtual machine of the same or similar type is received.

In the above method for deploying a virtual machine according to the embodiment of the present invention, the node on which the virtual machine is to be deployed is selected based on the virtual machine resource usage pattern matching the virtual machine to be deployed. Because the virtual machine resource usage pattern is created based on the historical running data of a virtual machine (or a set of virtual machines) of a type identical or similar to the virtual machine to be deployed, and can reflect a resource usage status which most likely occurs when the virtual machine to be deployed runs, the node selected in this way can meet the dynamic resource requirements of the virtual machine to be deployed, thereby optimizing system throughput and providing good customer experience. In addition, since the created virtual machine resource usage pattern is constantly updated, it can be ensured that the resource usage information recorded in the virtual machine resource usage pattern is always close to the real resource usage status, which renders that the selected node is more suitable for the virtual machine to be deployed.

Figure 5:
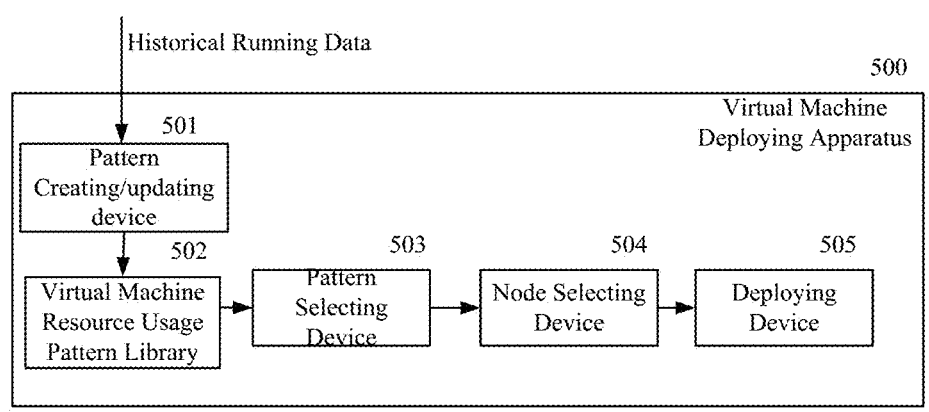
FIG. 5 shows a block diagram of an apparatus for deploying a virtual machine in a cloud computing environment according to an embodiment of the present invention.

With reference now to FIG. 5, an apparatus for deploying a virtual machine in a computing environment according to an embodiment of the present invention is described below. The apparatus can execute the method for deploying the virtual machine described above. Further, the apparatus can be provided in the computing environment, for example, on a certain management node of the computing environment, or be provided in another proper position. Likewise, the embodiment of the present invention is described here by taking the cloud computing environment as an example, but the embodiment is also applicable to other types of computing environments.

As depicted in FIG. 5, the apparatus 500 for deploying the virtual machine comprises a pattern creating/updating device 501, a virtual machine resource usage pattern library 502, a pattern selecting device 503, a node selecting device 504, and a deploying device 505.

As stated above, multiple virtual machines for different customers and/or one or more virtual machines for a single customer may have been deployed and run in the cloud computing environment. These virtual machines can be categorized into the same or different types based on their attribute information. The pattern creating/updating device 501 can create, based on historical running data of at least one virtual machine of each type that has been deployed, a virtual machine resource usage pattern corresponding to the virtual machine of such type as described above, where the virtual machine resource usage pattern may at least include attribute information of the virtual machine of such type and resource usage information of the virtual machine of such type at runtime, and the resource usage information indicates resource requirement features of the virtual machine of such type at runtime. Additionally, after a virtual machine resource usage pattern matching the virtual machine to be deployed is selected as described below, and a node is selected based on the virtual machine resource usage pattern and the virtual machine is deployed on the node, the pattern creating/updating device 501 can update the selected virtual machine resource usage pattern based on the resource usage information of the deployed virtual machine at runtime. The pattern creating/updating device 501 can create/update the virtual machine resource usage pattern in the above-described manner, and a detailed description thereof is omitted here to avoid repetition. The virtual machine resource usage pattern library 502 may be used to store at least one virtual machine resource usage pattern created or updated by the pattern creating/updating device 501. In other embodiments, at least one virtual machine resource usage pattern created in advance can be received externally, in which case the pattern creating/updating device 501 and/or the virtual machine resource usage pattern library 502 can be omitted.

The pattern selecting device 503 selects the virtual machine resource usage pattern matching the virtual machine to be deployed from the at least one virtual machine resource usage pattern, in response to a request to deploy the virtual machine.

Specifically, as described above, when a customer needs to use computing resources of the cloud computing environment, the customer sends the request to deploy the virtual machine. The request contains attribute information of the virtual machine, which may be all or a part of the attribute information contained in the virtual machine resource usage pattern, and can be specified by the customer. In response to the request, the pattern selecting device 503 selects the virtual machine resource usage pattern matching the virtual machine to be deployed from at least one virtual machine resource usage pattern stored in the virtual machine resource usage pattern library. The pattern selecting device 503 can select the virtual machine resource usage pattern in the manner described above with reference to FIG. 4. Briefly, the pattern selecting device 503 can select, from the at least one virtual machine resource usage pattern, a virtual machine resource usage pattern having attribute information which is the same as at least a part of the attribute information contained in the request, as the virtual machine resource usage pattern matching the virtual machine to be deployed. Or, the pattern selecting device 503 can select, from the at least one virtual machine resource usage pattern, a virtual machine resource usage pattern having attribute information which is the same as at least a part of the attribute information contained in the request and meeting an additional criterion, as the virtual machine resource usage pattern matching the virtual machine to be deployed. Here, the attribute information contained in the request can be divided into a plurality levels, and the pattern selecting device 503 can determine, from the attribute information contained in the request, the attribute information which the virtual machine resource usage pattern matching the virtual machine to be deployed should have in an order of the levels (e.g., in an order from a low level to a high level).

The node selecting device 504 selects a node on which the virtual machine is to be deployed from the plurality of nodes based on the virtual machine resource usage pattern selected by pattern selecting device 503 and available resources of the plurality of nodes in the cloud computing environment. The node selecting device 504 can select the node which can be used to deploy the virtual machine by comparing the resource consumption amounts recorded in the resource consumption amount information in the selected virtual machine resource usage pattern with the available resources of the respective nodes.

In addition, in the case where the pattern selecting device 503 still can not find the virtual machine resource matching pattern matching the virtual machine to be deployed after the level-by-level selection operations, the node selecting device 504 may check whether there are empirical data corresponding to the virtual machine to be deployed as described above. If there are such empirical data, the node selecting device 504 can use the empirical data as the predicted resource consumption amount of the virtual machine to be deployed at runtime, and thereby can select the node on which the virtual machine is to be deployed based on the empirical data and the available resources of the respective nodes. On the other hand, if there are no such empirical data, the node selecting device 504 can select the node in the cloud computing environment randomly as the node used to deploy the virtual machine.

The deploying device 505 deploys the virtual machine on the node selected by the node selecting device 504. In this way, the customer can be provided with services by running the deployed virtual machine. The deploying device 505 can deploy the virtual machine in the manner commonly known in the art. For example, the deploying device 505 can extract an appropriate virtual machine image from the preset virtual machine image library (not shown and deploy it on the selected node, so as to deploy the virtual machine.

Thus, by selection of the node on which the virtual machine is to be deployed based on the virtual machine resource usage pattern matching the virtual machine to be deployed by a customer, the dynamic resource requirements of the virtual machine to be deployed at runtime can be predicted based on the virtual machine resource usage pattern, so as to ensure that the selected node can meet the dynamic resource requirements of the virtual machine to be deployed at runtime, and thereby avoid the problem that the system throughput decreases due to improper deployment and improve the customer experience. In addition, because the created virtual machine resource usage pattern is constantly updated, the resource usage information recorded in the virtual machine resource usage pattern is always close to the real resource usage values, which causes the selected node to be suitable for the virtual machine to be deployed. Moreover, by selecting the node and deploying the virtual machine through the above apparatus, the virtual machine for the customer can be deployed on different nodes in accordance with specific usage scenarios of the customer, so that loads on the respective nodes in the cloud computing environment are more balanced, and thereby the system throughput is further optimized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
in response to a request to deploy a virtual machine in a computing environment wherein the request identifies an ordered sequence of attributes that the virtual machine to be deployed comprises, one or more processors of a computer system selecting, from at least one virtual machine resource usage pattern stored in a virtual machine resource usage pattern library, a virtual machine resource usage pattern having attributes matching a subset of attributes in the ordered sequence of attributes, said selecting the virtual machine resource usage pattern based on an ordering of the attributes in the ordered sequence of attributes, wherein the virtual machine resource usage pattern library stores usage patterns for virtual machines previously deployed;
said one or more processors selecting, from a plurality of nodes in the computing environment, a node on which the virtual machine is to be deployed, said selecting the node based on the selected virtual machine resource usage pattern and predicted runtime resource requirements of the virtual machine to be deployed based on historical running data of a plurality of virtual machines;
said one or more processors configuring the virtual machine for being deployed on the selected node; and
said one or more processors deploying the virtual machine on the selected node.

2. The method of claim 1, wherein the at least one virtual machine resource usage pattern is a plurality of virtual machine resource usage patterns, wherein the attributes in the ordered sequence of attributes are denoted and sequenced as $A_1, A_2, \ldots, A_N$, wherein N is at least 2, and wherein said selecting the virtual machine resource usage pattern comprises:
  determining a maximum value of M in a range of 1 to N for which a condition is satisfied, wherein the condition is that one or more virtual machine resource usage patterns of the plurality of virtual machine resource usage patterns match $A_1, A_2, \ldots, A_M$.

3. The method of claim 2, wherein said determining the maximum value of M comprises initially setting M=N and subsequently iteratively looping through the ordered sequence of attributes from $A_M$ to $A_1$ to determine for each iteration of said looping whether the condition is satisfied, and if so then terminating said looping with a final value of M having been determined, and if not then decrementing M by 1 and performing a next iteration of said looping.

4. The method of claim 1, said method further comprising:
  said one or more processors updating the selected virtual machine resource usage by using resource usage information of the virtual machine deployed on the selected node at runtime.

5. The method of claim 1, wherein said selecting the node comprises:
  predicting the runtime resource requirements of the virtual machine to be deployed, wherein said predicting is based on the historical running data of the plurality of virtual machines, at the plurality of nodes, which have been previously deployed in the computing environment and which comprise the selected virtual machine resource usage pattern; and
  selecting the node on which the virtual machine is to be deployed as one node of the plurality of nodes having available resources exceeding the predicted runtime resource requirements of the virtual machine to be deployed.

6. The method of claim 5, wherein the historical running data of the plurality of virtual machines comprises amounts of specified resources previously consumed at runtime by each virtual machine of the plurality of virtual machines.

7. The method of claim 6, wherein said predicting is based on an average of the amounts of each specified resource previously consumed at runtime by each virtual machine of plurality of virtual machines.

8. A computer program product, comprising one or more computer readable hardware storage devices having computer readable program code stored therein, said program code containing instructions executable by one or more processors of a computer system to implement a method, said method comprising:
  in response to a request to deploy a virtual machine in a computing environment wherein the request identifies an ordered sequence of attributes that the virtual machine to be deployed comprises, said one or more processors selecting, from at least one virtual machine resource usage pattern stored in a virtual machine resource usage pattern library, a virtual machine resource usage pattern having attributes matching a subset of attributes in the ordered sequence of attributes, said selecting the virtual machine resource usage pattern based on an ordering of the attributes in the ordered sequence of attributes, wherein the virtual machine resource usage pattern library stores usage patterns for virtual machines previously deployed;
  said one or more processors selecting, from a plurality of nodes in the computing environment, a node on which the virtual machine is to be deployed, said selecting the node based on the selected virtual machine resource usage pattern and predicted runtime resource requirements of the virtual machine to be deployed based on historical running data of a plurality of virtual machines;
  said one or more processors configuring the virtual machine for being deployed on the selected node; and
  said one or more processors deploying the virtual machine on the selected node.

9. The computer program product of claim 8, wherein the at least one virtual machine resource usage pattern is a plurality of virtual machine resource usage patterns, wherein the attributes in the ordered sequence of attributes are denoted and sequenced as $A_1, A_2, \ldots, A_N$, wherein N is at least 2, and wherein said selecting the virtual machine resource usage pattern comprises:
  determining a maximum value of M in a range of 1 to N for which a condition is satisfied, wherein the condition is that one or more virtual machine resource usage patterns of the plurality of virtual machine resource usage patterns match $A_1, A_2, \ldots, A_M$.

10. The computer program product of claim 9, wherein said determining the maximum value of M comprises initially setting M=N and subsequently iteratively looping through the ordered sequence of attributes from $A_M$ to $A_1$ to determine for each iteration of said looping whether the condition is satisfied, and if so then terminating said looping with a final value of M having been determined, and if not then decrementing M by 1 and performing a next iteration of said looping.

11. The computer program product of claim 8, said method further comprising:
  said one or more processors updating the selected virtual machine resource usage by using resource usage information of the virtual machine deployed on the selected node at runtime.

12. The computer program product of claim 8, wherein said selecting the node comprises:
  predicting the runtime resource requirements of the virtual machine to be deployed, wherein said predicting is based on the historical running data of the plurality of virtual machines, at the plurality of nodes, which have been previously deployed in the computing environment and which comprise the selected virtual machine resource usage pattern; and
  selecting the node on which the virtual machine is to be deployed as one node of the plurality of nodes having available resources exceeding the predicted runtime resource requirements of the virtual machine to be deployed.

13. The computer program product of claim 12, wherein the historical running data of the plurality of virtual machines comprises amounts of specified resources previously consumed at runtime by each virtual machine of the plurality of virtual machines.

14. The computer program product of claim 13, wherein said predicting is based on an average of the amounts of each specified resource previously consumed at runtime by each virtual machine of plurality of virtual machines.

15. A computer system, comprising one or more processors, one or more memories, and one or more computer readable hardware storage devices, said one or more hardware storage devices containing program code executable by the one or more processors via the one or more memories to implement a method, said method comprising:

in response to a request to deploy a virtual machine in a computing environment wherein the request identifies an ordered sequence of attributes that the virtual machine to be deployed comprises, said one or more processors selecting, from at least one virtual machine resource usage pattern stored in a virtual machine resource usage pattern library, a virtual machine resource usage pattern having attributes matching a subset of attributes in the ordered sequence of attributes, said selecting the virtual machine resource usage pattern based on an ordering of the attributes in the ordered sequence of attributes, wherein the virtual machine resource usage pattern library stores usage patterns for virtual machines previously deployed;

said one or more processors selecting, from a plurality of nodes in the computing environment, a node on which the virtual machine is to be deployed, said selecting the node based on the selected virtual machine resource usage pattern and predicted runtime resource requirements of the virtual machine to be deployed based on historical running data of a plurality of virtual machines;

said one or more processors configuring the virtual machine for being deployed on the selected node; and said one or more processors deploying the virtual machine on the selected node.

16. The computer system of claim 15, wherein the at least one virtual machine resource usage pattern is a plurality of virtual machine resource usage patterns, wherein the attributes in the ordered sequence of attributes are denoted and sequenced as $A_1, A_2, \ldots, A_N$, wherein N is at least 2, and wherein said selecting the virtual machine resource usage pattern comprises:

determining a maximum value of M in a range of 1 to N for which a condition is satisfied, wherein the condition is that one or more virtual machine resource usage patterns of the plurality of virtual machine resource usage patterns match $A_1, A_2, \ldots, A_M$.

17. The computer system of claim 16, wherein said determining the maximum value of M comprises initially setting M=N and subsequently iteratively looping through the ordered sequence of attributes from $A_M$ to $A_1$ to determine for each iteration of said looping whether the condition is satisfied, and if so then terminating said looping with a final value of M having been determined, and if not then decrementing M by 1 and performing a next iteration of said looping.

18. The computer system of claim 15, said method further comprising:

said one or more processors updating the selected virtual machine resource usage by using resource usage information of the virtual machine deployed on the selected node at runtime.

19. The computer system of claim 15, wherein said selecting the node comprises:

predicting the runtime resource requirements of the virtual machine to be deployed, wherein said predicting is based on the historical running data of the plurality of virtual machines, at the plurality of nodes, which have been previously deployed in the computing environment and which comprise the selected virtual machine resource usage pattern; and selecting the node on which the virtual machine is to be deployed as one node of the plurality of nodes having available resources exceeding the predicted runtime resource requirements of the virtual machine to be deployed.

20. The computer system of claim 19, wherein the historical running data of the plurality of virtual machines comprises amounts of specified resources previously consumed at runtime by each virtual machine of the plurality of virtual machines.

* * * * *